United States Patent

Zeile, Jr. et al.

[15] 3,642,308
[45] Feb. 15, 1972

[54] CONDUIT SYSTEM

[72] Inventors: George D. Zeile, Jr., Medina; Robert O. Couch, Wadsworth, both of Ohio

[73] Assignee: Anvil Industries, Inc., Brecksville, Ohio

[22] Filed: Sept. 25, 1969

[21] Appl. No.: 861,122

[52] U.S. Cl..................285/47, 248/49, 285/61, 285/138, 285/177, 285/174, 285/423
[51] Int. Cl....................................F16l 11/12
[58] Field of Search.............285/47, 48, 49, 50, 51, 52, 285/53, 54, 61, 174, 423, 64, 177, 178, 133, 138; 138/109, 113, 149; 248/49

[56] References Cited

UNITED STATES PATENTS

| 2,546,533 | 3/1951 | Williamson | 248/49 |
| 2,695,254 | 11/1954 | Isenberg | 138/149 X |
| 3,068,026 | 12/1962 | McKamey | 285/47 |
| 3,246,917 | 4/1966 | Martin | 285/47 |
| 3,351,361 | 11/1967 | Martin | 285/47 |
| 3,492,029 | 1/1970 | French et al. | 285/138 X |

FOREIGN PATENTS OR APPLICATIONS

| 261,862 | 5/1968 | Germany | 285/47 |
| 1,296,898 | 6/1969 | Germany | 285/47 |

Primary Examiner—Dave W. Arola
Attorney—Watts, Hoffman, Fisher & Heinke

[57] ABSTRACT

A conduit system constructed of prefabricated sections, each including a fluid-conducting pipe supported within and extending through a plastic casing. The pipe in each prefabricated section may be provided with bell and spigot ends to facilitate quick connection of the pipe sections in the field. In one embodiment, the pipe is insulated and is supported in spaced relation to the inner surfaces of the sections of casing by nonferrous pipe supports to form an annular air space through the system around the insulated pipe. In another embodiment of the invention, each casing section is filled with foam insulation around the pipe and the ends of the casing are capped to form a sealed unit. The conduit system includes anchors for restricting longitudinal movement of the pipe, seals for the ends of conduit runs, reducer structure between the ends of casing sections of different diameters, and elbow structure designed to form thrust blocks to resist longitudinal movement of the pipe.

8 Claims, 13 Drawing Figures

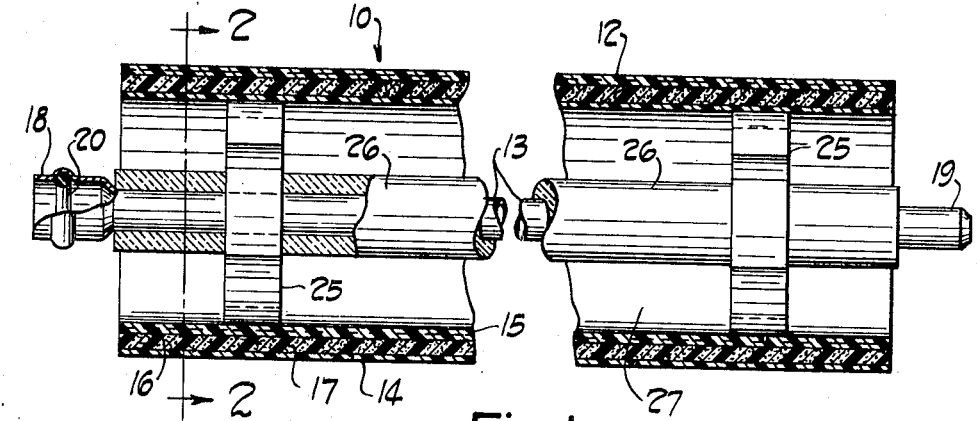
Fig. I
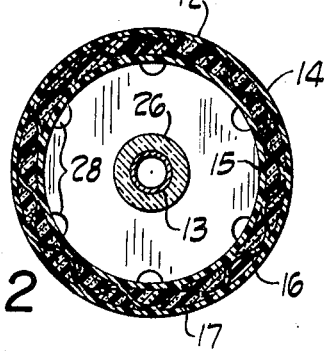
Fig. 2
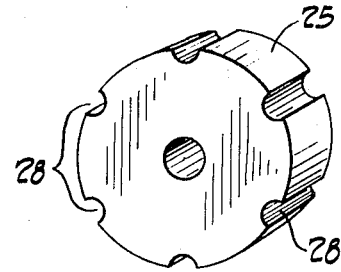
Fig. 3
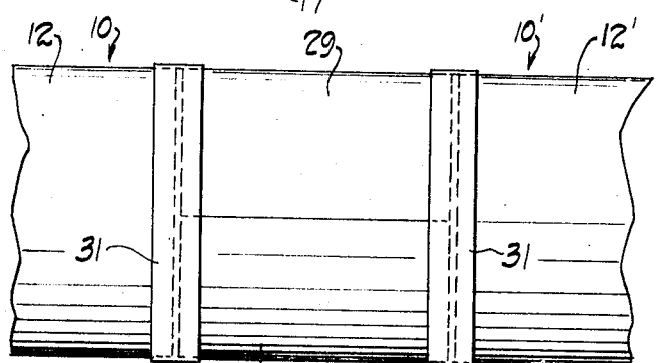
Fig. 4
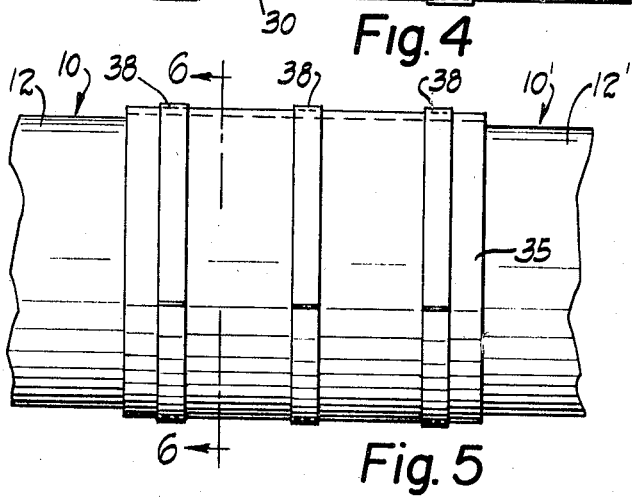
Fig. 5
Fig. 6
INVENTORS
GEORGE D. ZEILE, JR.
ROBERT O. COUCH
BY Watts, Hoffmann,
Fisher & Heinke
ATTORNEYS

CONDUIT SYSTEM

BACKGROUND OF THE INVENTION

This invention relates generally to conduit systems, and more specifically to improvements in conduit systems of the type which include a fluid-conducting pipe supported within an outer casing and which are formed in prefabricated sections designed to be connected together at the site of installation.

The invention is particularly concerned with conduit systems suitable for use in transporting fluids, such as steam, hot and chilled water, and the like, at temperatures differing from ambient temperatures. Such conduit systems are conventionally constructed in sections, each of which includes at least one fluid-conducting pipe supported within and extending through an outer casing. The individual sections of the conduit system are prefabricated at the factory and are field-assembled by joining the sections of pipe, usually by welding, to form a continuous flow passage. In accordance with conventional practice, the sections of casing around the pipe also are connected together. In order to facilitate field assembly, it is desirable to construct the prefabricated sections so that they can be connected together as rapidly and easily as possible.

Since the pipes are subject to temperature variations when used to transport fluids such as steam and hot and chilled water, suitable expansion-absorbing structure, such as loops and joints, are provided at spaced locations throughout the conduit system. The connected pipes are firmly anchored against axial movement intermediate the expansion joints or loops. In a subterranean installation, for example, the conduit system is provided with anchor structure connected to the pipe and extending into a matrix such as concrete. Thus installed, axial movement of the pipes due to expansion and contraction takes place between the anchor locations and is properly distributed between the various expansion joints or loops.

Where the conduit system passes through the wall of a building or other structure, such as a manhole, the outer casing is often terminated at the wall and only the fluid-conducting pipe extends beyond the inner face of the wall. In such locations, it is necessary to provide a seal between the pipe and the outer casing to prevent the entry of moisture and other contaminants into the system. Other elements of conduit systems of the type described, include elbows provided at locations where the system changes direction, and reducer structure which is provided at locations where casing sections of different diameters are connected together.

SUMMARY OF THE INVENTION

The conduit system of the present invention preferably includes a casing made of plastic, and an object of the invention is to provide new anchoring, sealing, elbow and reducer structure particularly adapted for conduit systems utilizing plastic casing.

Another object of the invention is to provide a new conduit anchor particularly adapted for use in conduit systems embodying a casing made of plastic.

A further object of the invention is to provide new seal structure for the ends of conduit runs formed by casing sections made of plastic.

Still another object of the invention is to provide a new elbow structure which serves as a thrust block to resist longitudinal movement of the pipe of a conduit system.

A further object of the invention is to provide a conduit system made of prefabricated sections which can be easily and quickly connected together at the site of installation.

A further object of the invention is to provide a conduit system constructed of prefabricated, sealed sections which can be quickly and easily connected together at the site of installation.

Other objects and a full understanding of the invention will be had by reference to the following detailed description and the accompanying drawings.

BRIEF DESCRIPTION OF THE DRAWINGS

FIG. 1 is a foreshortened, cross-sectional view of a prefabricated conduit section according to one embodiment of the invention;

FIG. 2 is a cross-sectional view taken along the line 2—2 of FIG. 1;

FIG. 3 is a perspective view of a pipe support used in the conduit section illustrated in FIG. 1;

FIG. 4 is a fragmentary, elevational view showing two conduit sections connected together in accordance with one embodiment of the invention;

FIG. 5 is a fragmentary, perspective view showing two conduit sections connected together in accordance with another embodiment of the invention;

FIG. 6 is a cross-sectional view taken along the lines 6—6 of FIG. 5;

DESCRIPTION OF THE PREFERRED EMBODIMENTS

Figure 7:
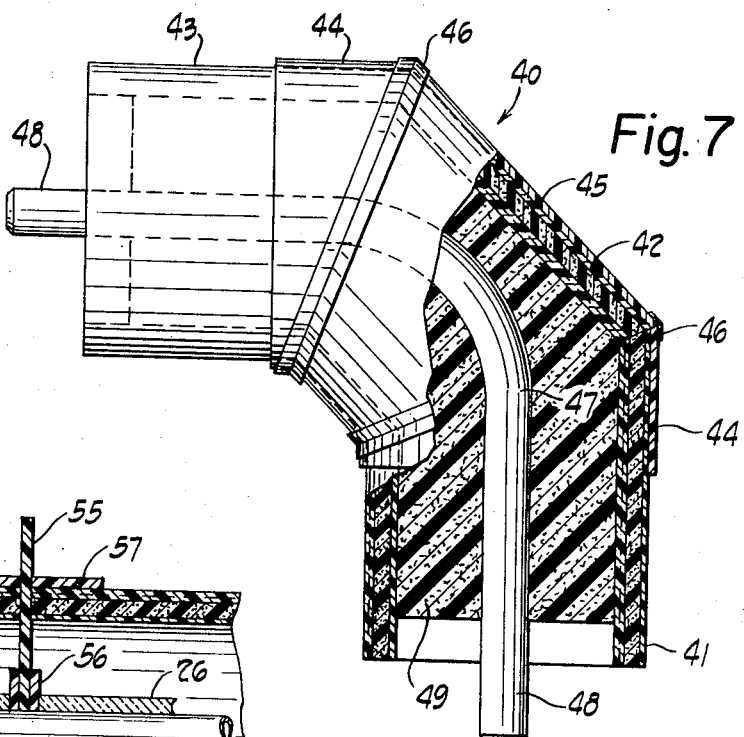
FIG. 7 is a view partially in cross section of an elbow for use in a conduit system according to the present invention.

Referring now to the drawings, and to FIGS. 1 and 2 in particular, there is shown a prefabricated section 10 of a conduit system constructed in accordance with one preferred embodiment of the present invention. The illustrated conduit section 10 includes an outer casing 12 and a fluid-conducting pipe 13 extending through the casing.

The outer casing 12 is preferably made of plastic. As shown, the casing construction includes an outer tube 14 and a coaxial, radially spaced, inner tube 15. Both tubes are preferably made of plastic, such as acrylonitrile budtadiene styrene, polyvinyl chloride, polyvinyl ethylene or the like. A corrugated or truss formation 16 extends between the tubes 14, 15 along their lengths. The corrugated or truss formation 16 may be in the form of a web which is extruded integrally with the tubes. The spaces between the tubes 14, 15 and the corrugated formation 16 are filled with an insulating material 17 which is preferably a foamed resin, such as polyurethane or the like. Alternatively, the insulating material 17 may be a suitable cement.

The fluid-conducting pipe 13 within the casing 12 also may be made of plastic such as polyvinyl chloride or the like. Polyvinyl chloride pipes are particularly well suited for conveying chilled water. In applications involving the transmission of hot water, the pipe 13 may be made of plastic, a suitable cementitious material such as asbestos cement, or the like. Alternatively, the pipe 13 may be made of copper or other material. The pipe 13 is preferably constructed with a bell end 18 and a spigot end 19 in order to facilitate field assembly of the prefabricated conduit sections 10. The bell end 18 includes an internally mounted seal ring 20.

In the embodiment of the invention shown in FIGS. 1 and 2, the pipe 13 is supported within the casing 12 by a plurality of pipe supports 25 which are disposed along the length of the pipe. The supports 25 engage the inner surface of the tube 15 and have openings through which the pipe 13 extends. Each of the supports 25 may be made of a molded plastic material, preferably a compression molded polyurethane foam. The portions of the pipe 13 between adjacent supports 25 are preferably covered by jackets or sleeves 26 of a suitable insulating material, such as fiber glass or the like.

The pipe 13, including the surrounding sleeves 26 of insulation material, are supported by the members 25 within the casing 12 in spaced relation to its inner surface so as to provide an annular air-insulating space 27 between each pair of adjacent supports 25. As is best shown in FIGS. 2 and 3, the outer periphery of each pipe support 25 is formed with circumferentially spaced grooves or notches 28. The grooves or notches 28 around the outer surface of each support form air insulating passages which communicate the spaces 27 on either side of each support within the casing 12. It will thus be seen that the insulated pipe 13 is surrounded by a substantially continuous air insulating cavity throughout the length of the casing 12.

It is to be understood that a complete conduit system will include as many of the described sections 10 as are required and that these sections may include any desired number of fluid-conducting pipes. During installation the several prefabricated sections of the conduit system are aligned end to end and the adjacent ends of the pipes are connected to provide a continuous fluid-flow passage. The illustrated bell and spigot construction of the pipe 13 facilitates such installation. The bell and spigot connections can be made simply by forcing the spigot end of a pipe of one prefabricated conduit section 10 into the bell end of the pipe in the adjacent conduit section to form a watertight joint which permits pressure to be applied immediately. Thus, the preferred bell and spigot connection eliminates the time and difficulties involved in forming welded pipe joints, as has been conventional practice in the past.

The ends of the adjacent casing sections 12 are connected after the pipe joints have been made. One manner of connecting the casing sections is illustrated in FIG. 4. As here shown, the casings 12, 12' of two prefabricated conduit sections 10, 10', respectively, are spaced apart to permit the connection of the pipes (not shown). After the pipe connection has been made, two semicylindrical casing sections 29, 30 are placed around the pipe joint between the ends of the casings 12, 12'. The ends of the members 29, 30 are sealed to the casing sections 12, 12' by wrappings of fiberglass tape 31 or the like. The mating longitudinal edges of the members 29, 30 may be secured together by a suitable adhesive or by fiber glass tape (not shown).

Another manner of connecting the casings 12, 12' of adjacent conduit sections 10, 10', respectively is illustrated in FIGS. 5 and 6. A longitudinally split connector band 35 extends between and around the spaced end portions of the casings 12, 12'. As best shown in FIG. 6, one longitudinal edge portion 36 of the split connector band 35 is feathered or tapered and is overlapped by the other longitudinal edge 37 of the connector band. The two longitudinal edges 36, 37 of the connector band 35 may be secured together by epoxy cement, if desired. Suitable bands 38 are provided around the connector band 35 to secure it in position relative to the ends of the casing sections 12, 12'.

Referring to FIG. 7, there is shown an elbow construction 40 which may be employed in the above-described conduit system at locations where it changes direction. The elbow structure 40 includes a casing formed in three sections 41, 42 and 43, each of which is shown as being identical in construction to the casing 12 described above in connection with FIG. 1. One end of each of the sections 41, 43 is cut at a 45° angle to the longitudinal axis of the section. The ends of the intermediate section 42 are each cut at a 45° angle to mate with the beveled faces of the sections 41, 43 and thus form a 90° bend. As shown, a plastic reinforcing ring or collar 44 is provided around each beveled end portion of the sections 41, 43 and a similar reinforcing ring or collar 45 is provided around the intermediate section 42. The joints between the reinforcing rings or collars 44, 45 are reinforced by fiber glass tape 46 or the like.

A fluid-conducting pipe 47 having arms 48 extending at right angles to one another is mounted within the casing of the elbow 40. The pipe arms 48 project beyond the ends of the casing sections 41, 43 and are formed with spigot ends adapted to be fitted in the bell ends of other pipes (not shown) in the manner previously described in connection with the construction of FIG. 1. In accordance with the invention, the elbow casing formed by the sections 41, 42 and 43 is filled with polyurethane foam 49 or the like around the pipe 47. The polyurethane foam 49 serves as a thrust block to resist longitudinal movement of the pipes (not shown) which are connected to the pipe arms 48 thereby preventing flexing of the pipe elbow 47 which could loosen the pipe connections.

Figure 8:
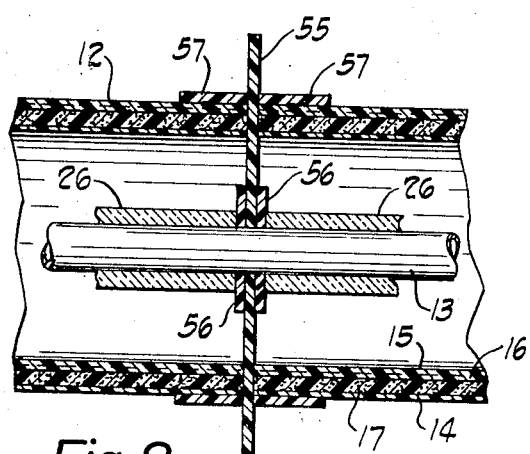
FIG. 8 is a fragmentary, cross-sectional view of a conduit system utilizing a new anchor structure according to one embodiment of this invention.

A conduit anchoring structure suitable for use at spaced locations in the conduit system to restrain the components thereof against axial or longitudinal movement is shown in FIG. 8. The illustrated structure is comprised of a plate 55 having a hole through which the pipe 13 extends. The plate 55 is secured to the pipe 13 by a pair of rings 56 which are bonded to the pipe 13 and to the plate 55 on opposite sides thereof.

The casing 12 of the conduit system is shown as being formed in two axially spaced sections having their adjacent ends chemically welded or bonded to the opposite faces of the anchor plate 55. A pair of sleeves 57 are disposed in axial alignment on opposite sides of the anchor plate 55 around the end portions of the conduit casing sections 12. The sleeves 57 are bonded to the casing sections and to the anchor plate to strengthen the joint connection and to guard against the entry of moisture into the conduit system.

In accordance with conventional practice, the anchor plate 55 has portions which extend outwardly of the casing sections 12 for attachment to a fixed support. In a typical subterranean installation, the projecting portions of the anchor plate are embedded in a block of concrete or the like (not shown) which is cast in a ditch around the anchor.

Figure 9:
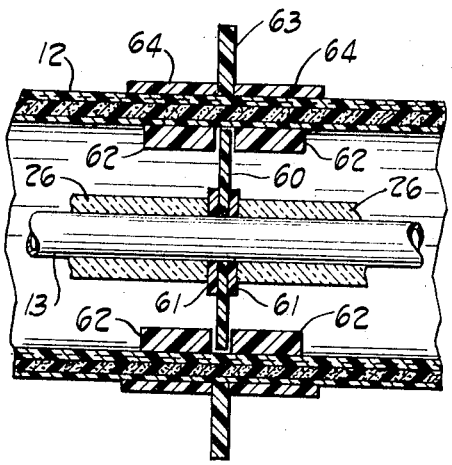
FIG. 9 is a fragmentary, cross-sectional view of a conduit system utilizing a new anchor structure according to another embodiment of this invention.

FIG. 9 illustrates a modified anchor construction suitable for use in the described conduit system. This embodiment of the anchor includes a ring 60 which is connected to the pipe 13 and is disposed entirely within the casing 12. The ring 60 may be connected to the pipe 13 by smaller rings 61 which are bonded to the pipe and to the ring 60 on opposite sides thereof. Blocks 62 are secured to the inner surface of the casing 12 on opposite sides of the anchor ring 60. The blocks 62 substantially eliminate movement of the pipe 13 relative to the surrounding casing 12.

An outer anchor ring 63 is secured around the casing 12. The connection between the outer ring 63 and the casing 12 may be strengthened by sleeves 64 which surround and are connected to the casing on opposite sides of the ring 63. The outer anchor ring 63 is adapted to be embedded in concrete or attached to a suitable fixed support (not shown). The described two-part anchor construction including the inner and outer rings 60, 63 can be mounted in place without breaking the casing 12, and thus the arrangement shown in FIG. 9 eliminates any possibility of moisture or water leaking into the casing.

Figure 10:
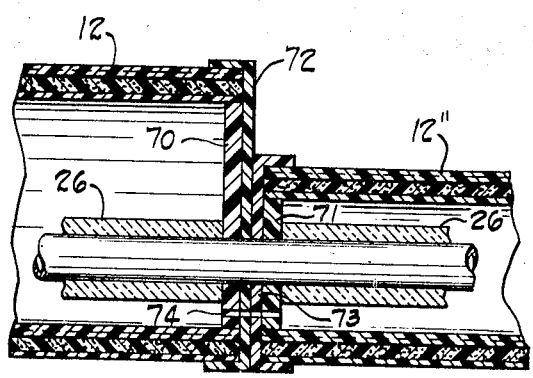
FIG. 10 is a cross-sectional view illustrating a conduit system embodying the new reducer structure of this invention.

Referring now to FIG. 10, there is shown a reducer structure suitable for use at locations where casing sections 12, 12" are connected together. In accordance with this aspect of the invention, the adjacent ends of the casing sections 12, 12" may be plugged by a sheet of plastic 70, 71, respectively, both of which may be secured in position by adhesive or the like. End caps 72, 73 are secured to the ends of the casing sections 12, 12", respectively, against the faces of the plugs or closures 70, 71. Each end cap 72, 73 is shown as having a peripheral flange which is bonded or otherwise secured around the end of the casing section. The end caps 72, 73 abut each other and are fixed together by adhesive, chemical welding or the like. Preferably, one or more vent passages 74 are formed through the members 70–73.

Figure 11:
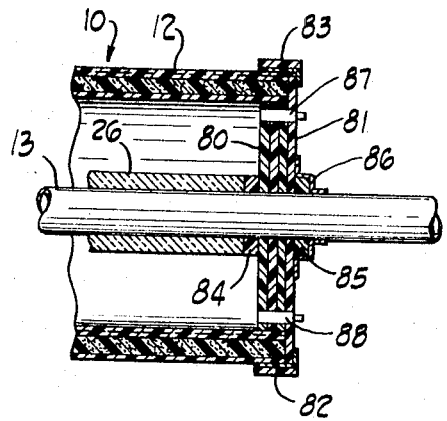
FIG. 11 is a fragmentary, cross-sectional view of a conduit system embodying the new seal of this invention.

Reference is now made to FIG. 11 which illustrates an end seal for closing the ends of a run of conduit formed by the prefabricated sections 10. The illustrated end seal is suitable for use at the ends of conduit runs which terminate close to an anchor, for example, 5 feet or less, so that there is little or no relative movement between the pipe 13 and the casing 12.

The end seal construction shown in FIG. 11 includes a laminated member 80 formed by sheets of plastic which are secured together. The outermost sheet 81 of the laminated member 80 covers the end face of the conduit 12 and has substantially the same external diameter. The external, peripheral joint between the sheet 81 and the casing 12 is closed by a fiber glass tape reinforcement 82 which is cemented in place. A plastic ring 83 is preferably heat-shrunk around the casing 12 and the tape 82 to assure a watertight seal. As shown, the member 80 is held in place within the end of the casing 12 by retaining rings 84, 85 which are secured to the pipe 13 on opposite sides of the member 80. The outermost retaining ring 85 is covered by a cemented, fiber glass tape 86. The member 80 may be provided with conventional vent and drain plugs 87, 88, respectively.

Figure 12:
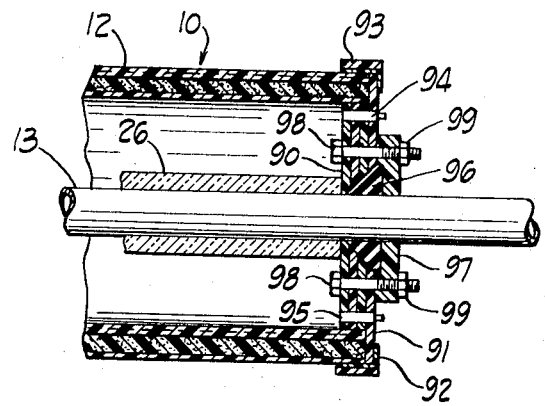
FIG. 12 is a fragmentary cross-sectional view of a conduit system including another embodiment of the new seal of this invention; and, FIG. 13 is a fragmentary view, partially in cross section, of a conduit system according to another embodiment of this invention.

FIG. 12 illustrates a seal construction of a type which permits longitudinal expansion and contraction of the fluid-conducting pipe 13 relative to the outer casing 12. Such seals are used in locations where the conduit runs terminate five feet or more from an anchor point and where the conduit runs terminate at expansion joints. Referring to FIG. 12, the illustrated seal construction includes a member 90 which fits within and closes the end of the casing 12. The member 90 is of a laminated construction formed by sheets of plastic cemented or otherwise secured together. As in the seal construction of FIG. 11, the outermost sheet 91 of the member 90 extends across the end face of the casing 12 and is peripherally sealed to the casing by a cemented fiberglass tape 92 and a ring 93. The coupling ring 93 may be made of plastic and heat-shrunk into place. Vent and drain plugs 94, 95, respectively are provided in the member 90.

The member 90 is formed with a recess around the pipe 13 and a preformed gasket 96 of neoprene or the like is fitted into the recess in sealing engagement with the pipe. The gasket 96 is held in place around the pipe by a plastic retaining ring 97. The member 90 and the retaining ring 97 are secured together by bolts 98 and nuts 99.

Figure 13:
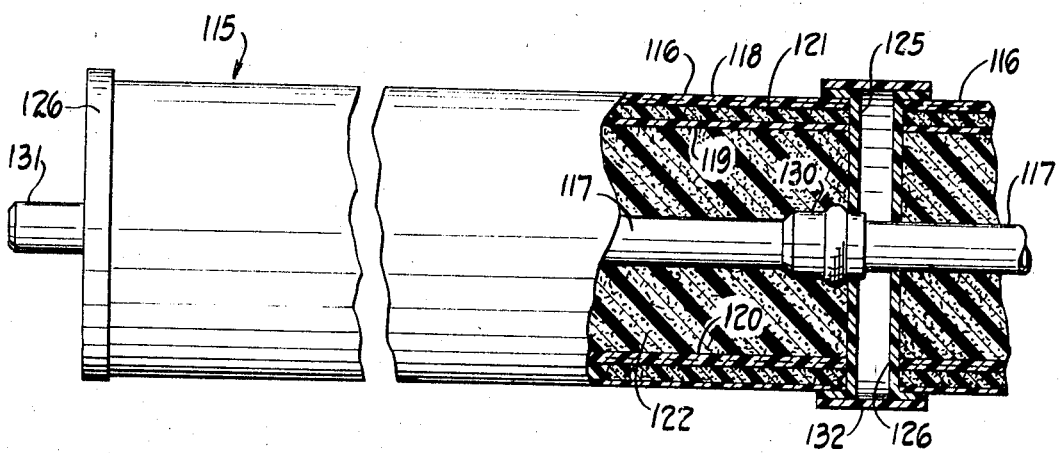

A second preferred embodiment of a prefabricated conduit section 115 is shown in FIG. 13. The illustrated conduit section 115 is comprised of an outer casing 116 and an inner fluid-conducting pipe 117 which extends through the casing and projects beyond its ends.

The casing 116 is identical in construction to the casing 12 described above in connection with the embodiments of FIG. 1. The casing 116 is formed by coaxial, radially spaced inner and outer plastic tubes 118, 119, respectively, and strengthening and insulating structure between the tubes. The strengthening and insulating structure is comprised of a corrugated web formation 120 which is shown as extending the length of the tubes 118, 119. As in the embodiment of FIG. 1, the corrugated web formation 120 may be formed integrally with the tubes 118, 119. The spaces between the corrugated web formation 120 and the tubes 118, 119 are filled with an insulating material, preferably a foamed resin 121, such as polyurethane or the like. Alternatively, the insulating material may be a suitable concrete.

In this embodiment of the invention, the casing 116 is filled with a foam resin 122, such as polyurethane or the like, around the pipe 117. When the casing is filled with foam around the pipe as shown in FIG. 13, any problem of condensation of moisture within the casing which could damage insulation sleeves around the pipe is eliminated. The ends of the casing 116 are closed by end caps 125, 126 to form a completely sealed unit. Each end cap 125, 126 has a peripheral flange which is bonded or chemically welded to the outside of the casing 116. The inner peripheral edge of each end cap 125, 126 may be suitable sealed or bonded around the end portion of the pipe 117 projecting through the end cap to provide a fluidtight closure.

As in the embodiment of the invention described above in connection with FIG. 1, it will be understood that a complete conduit system will include as many of the sealed sections 115 as are required and that these sections may include any desired number of fluid-conducting pipes. During installation, the several prefabricated conduit sections 115 are laid end to end in axially spaced relation and the pipes 117 of adjacent sections are connected to form a continuous flow passage. As shown, the pipe 117 of each prefabricated section is formed with a bell end 130 and a spigot end 131 in order to facilitate field assembly of the pipes and to eliminate the time and difficulties involved in welding the pipes together according to conventional practice.

If desired, the space around the pipe joint between the end caps 125, 126 of adjacent conduit sections may be closed by a band 132 which is secured in place around the flanges of the end caps. The band 132 is not required, however, and serves only to prevent dirt and debris from contacting the pipe joints. Since each prefabricated conduit section 115 is completely sealed by the end caps 125, 126, the pipes of the several sections can be connected together and the band 132 eliminated.

It will be apparent from the foregoing description that the invention has provided a new, efficient and economical factory fabricated conduit system which can be entirely constructed of corrosion resistant, nonmetallic materials. In one embodiment of the invention, the new conduit system is constructed to provide an insulating air space around the fluid-conducting pipe so as to permit positive testing of the system's integrity and for draining of any moisture that may enter the system as a result of damage. In another embodiment of the invention, each prefabricated conduit section is constructed as an individually sealed unit and the units can be installed simply by connecting the projecting pipe ends together. In both embodiments of the invention, the pipe is preferably formed with bell and spigot ends to facilitate field assembly. Other features of the described invention include new anchor structure especially adapted for anchoring the conduit at spaced locations to prevent expansion and contraction, special seal constructions for the ends of the conduit, reducer structure for use at locations where conduit casing sections of different diameters are connected together, and a new elbow structure designed and constructed to resist longitudinal pipe movement.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. A conduit system comprising a plurality of conduit sections, each of said conduit sections including a nonmetallic fluid-conducting pipe having a bell end and a spigot end, a casing surrounding said pipe in coaxial relationship to provide an annular space between said pipe and the inner surface of said casing, said casing having its ends terminating short of the ends of said pipe, thermal insulation means in said annular space around said pipe, plastic end caps closing the ends of said casing to form a sealed unit, said end caps having outer axially extending peripheral flanges bonded to the outer surface of said casing and inner peripheral edges bonded to said pipe to provide fluidtight closures, said pipes of adjacent conduit sections being connected together with the spigot end of one pipe engaged in the bell end of an adjacent pipe, and the casings of adjacent sections being disposed so that the adjacent end caps of said adjacent sections are spaced apart to expose the connected pipe ends extending from said adjacent end caps to the exterior of said casings.

2. A conduit system comprising a plurality of aligned conduit sections, each of said conduit sections including an outer casing, a fluid-conducting pipe within said casing, and insulation means around said pipe, the pipes of adjacent sections being connected together to form a continuous flow passage and the casings of adjacent sections being disposed in axially spaced relation, means sealing the ends of adjacent casings around the connected pipes, an anchor plate attached to the pipe of at least one of said sections, reinforcing means secured to the pipe of said one section and to opposite sides of said plate, the casing of said one section being formed in two axially spaced-apart portions having their adjacent ends abutting opposite sides of said plate and secured thereto, a pair of sealing and reinforcing sleeves disposed in axial alignment on opposite sides of said plate around said portions of said casing, said sleeves being secured to said casing portions and to said plate, and said plate having portions extending radially outwardly from said casing portions for attachment to a fixed support.

3. A conduit system comprising a plurality of aligned conduit sections, each of said conduit sections including an outer casing, a fluid-conducting pipe within said casing, and insulation means around said pipe, the pipes of adjacent sections being connected together to form a continuous flow passage and the casings of said adjacent sections being disposed in axially spaced relation, means sealing the ends of adjacent conduit sections around the connected pipes, a first anchor plate surrounding the pipe of at least one conduit section and disposed within the casing of said one conduit section, means securing said first anchor plate to the pipe in said one conduit section, abutment means secured to the inside of the casing of said one conduit section on opposite sides of said first anchor plate, and a second anchor plate secured to the outer surface of the casing of said one section, said second anchor plate extending radially outwardly for attachment to a fixed support.

4. A conduit system comprising a plurality of aligned conduit sections, each of said conduit sections including an outer casing, a fluid-conducting pipe within said casing, and insulation means around said pipe, the pipes of adjacent sections being connected together to form a continuous flow passage and the casings of said adjacent sections being disposed in axially spaced relation, means sealing the ends of said adjacent sections around the connected pipes, and at least one of said conduit sections defining an elbow, said elbow-defining section being formed in a plurality of parts which are connected together to form a bend, reinforcing means surrounding said elbow parts, means for sealing the joints between said elbow parts, and said insulation means of said elbow-defining section filling the inside of said elbow-defining section around the pipe therein to form thrust means for preventing flexing of the pipe of said elbow-defining section.

5. A conduit system comprising a plurality of aligned conduit sections, each of said conduit sections including an outer casing, a fluid-conducting pipe within said casing, and insulation means around said pipe, the pipes of adjacent sections being connected together to form a continuous flow passage and the casings of adjacent sections being disposed in axially spaced relation, means sealing the ends of said adjacent conduit sections around the connected pipes, and at least two adjacent conduit sections being formed with casings of different diameters, means sealing adjacent ends of said casing sections of different diameters, said sealing means of said adjacent ends of casings of different diameters including end caps closing the ends of each section around the pipe.

6. A conduit system comprising a plurality of aligned conduit sections, each of said conduit sections including an outer casing, a fluid-conducting pipe within said casing, and insulation means around said pipe, the pipes of adjacent sections being connected together to form a continuous flow passage and the casings of adjacent sections being disposed in axially spaced relation, means sealing the ends of the casings of adjacent sections around the connected pipes, a laminated plastic plate sealing the end of at least one conduit section around the pipe extending therethrough, said laminated plastic plate having a first portion disposed within the end of the casing of said one section around the pipe and a second portion sealed to the end of the casing of said one section, and reinforcing means secured to the pipe on opposite sides of said laminated plate.

7. A conduit system as claimed in claim 1 wherein said insulation means of each conduit section comprises a foamed resin filling the inside of said casing around the pipe extending therein.

8. A conduit system as claimed in claim 3 wherein said means securing said first anchor plate to the pipe comprises a pair of rings on opposite sides of said first anchor plate and secured thereto and to the pipe, and wherein said means securing said second anchor plate to the casing includes a pair of sleeves surrounding the casing on opposite sides of said first anchor plate, each of said sleeves being secured to the outer surface of the casing and to said second anchor plate.

* * * * *